United States Patent
Blohowiak et al.

(10) Patent No.: US 9,475,964 B2
(45) Date of Patent: Oct. 25, 2016

(54) JOINING A THERMOPLASTIC MATERIAL AND A METAL

(71) Applicant: The Boeing Compnay, Chicago, IL (US)

(72) Inventors: Kay Youngdahl Blohowiak, Issaquah, WA (US); Kristin L. Krieg, Kirkland, WA (US); Robert A. Anderson, Jr., Federal Way, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/981,822

(22) Filed: Dec. 28, 2015

(65) Prior Publication Data

US 2016/0237323 A1  Aug. 18, 2016

Related U.S. Application Data

(62) Division of application No. 13/780,963, filed on Feb. 28, 2013, now Pat. No. 9,222,006.

(51) Int. Cl.
| | |
|---|---|
| *C09J 11/06* | (2006.01) |
| *C09J 9/00* | (2006.01) |
| *C09J 1/00* | (2006.01) |
| *C08J 5/12* | (2006.01) |
| *B32B 7/12* | (2006.01) |
| *B32B 15/08* | (2006.01) |
| *B32B 27/28* | (2006.01) |

(52) U.S. Cl.
CPC .................. *C09J 11/06* (2013.01); *B32B 7/12* (2013.01); *B32B 15/08* (2013.01); *B32B 27/285* (2013.01); *B32B 27/288* (2013.01); *C08J 5/12* (2013.01); *C09J 1/00* (2013.01); *C09J 9/00* (2013.01); *B32B 2250/02* (2013.01); *B32B 2255/06* (2013.01); *B32B 2255/24* (2013.01); *B32B 2605/18* (2013.01); *C08J 2300/22* (2013.01)

(58) Field of Classification Search
CPC ................................ B32B 27/06; C09J 11/06
USPC ........................................................ 156/325
See application file for complete search history.

(56) References Cited

U.S. PATENT DOCUMENTS

| | | |
|---|---|---|
| 5,789,085 A | 8/1998 | Blohowiak et al. |
| 5,814,137 A | 9/1998 | Blohowiak et al. |
| 5,849,110 A | 12/1998 | Blohowiak et al. |

(Continued)

OTHER PUBLICATIONS

Office Action, dated Apr. 28, 2015, regarding U.S. Appl. No. 13/7810,963, 14 pages.
Notice of Allowance, dated Aug. 12, 2015, regarding U.S. Appl. No. 13/780,963, 7 pages.

(Continued)

*Primary Examiner* — Daniel Lee
(74) *Attorney, Agent, or Firm* — Yee & Associates, P.C.

(57) ABSTRACT

A method and apparatus comprising a sol-gel solution. Zirconium n-propoxide is aged in a solvent to form a first part for the sol-gel solution. The first part is combined with deionized water to form a second part for the sol-gel solution. Aminoaryltrialkoxysilane is combined with an alcohol to form a third part for the sol-gel solution. The third part is combined with the second part to form a mixture for the sol-gel solution. The deionized water, or the alcohol, or a combination thereof is combined with the mixture to form a solution. The solution is aged to form the sol-gel solution comprising a mole balance ratio of approximately 1:5 between the zirconium n-propoxide and the aminoaryltrialkoxysilane.

8 Claims, 9 Drawing Sheets

(56) References Cited

U.S. PATENT DOCUMENTS

| | | |
|---|---|---|
| 5,869,140 A | 2/1999 | Blohowiak et al. |
| 5,869,141 A | 2/1999 | Blohowiak et al. |
| 5,939,197 A | 8/1999 | Blohowiak et al. |
| 5,958,578 A | 9/1999 | Blohowiak et al. |
| 6,037,060 A | 3/2000 | Blohowiak et al. |
| 6,039,832 A | 3/2000 | McCarville |
| 6,506,499 B1 * | 1/2003 | Blohowiak ............ B05D 3/102 106/287.13 |
| 8,158,245 B2 | 4/2012 | Pratte et al. |
| 2004/0178178 A1 | 9/2004 | Blohowiak et al. |
| 2008/0111027 A1 * | 5/2008 | Blohowiak .............. C09D 4/00 244/133 |
| 2010/0330380 A1 | 12/2010 | Colreavy et al. |
| 2014/0238595 A1 | 8/2014 | Blohowiak et al. |

OTHER PUBLICATIONS

Extended European Search Report, dated Jul. 24, 2014, regarding Application No. EP14154245.6, 5 pages.

Canadian Intellectual Property Office Examination Search Report, dated Apr. 20, 2015, regarding Application No. 2,838,936, 3 pages.

* cited by examiner

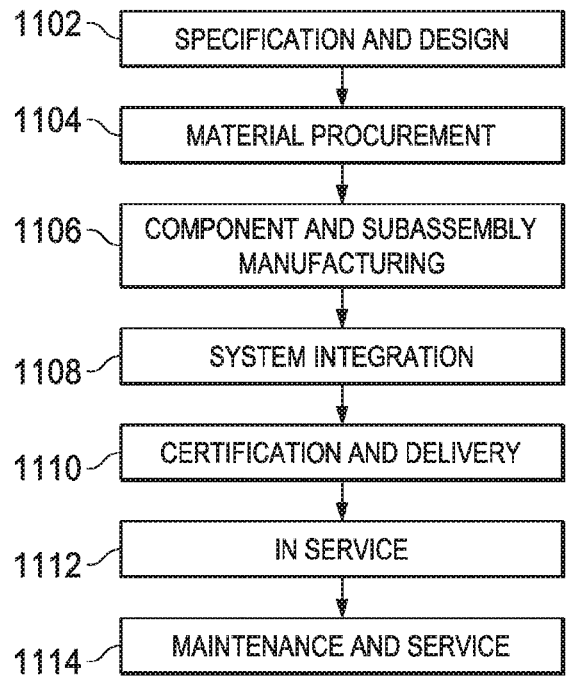
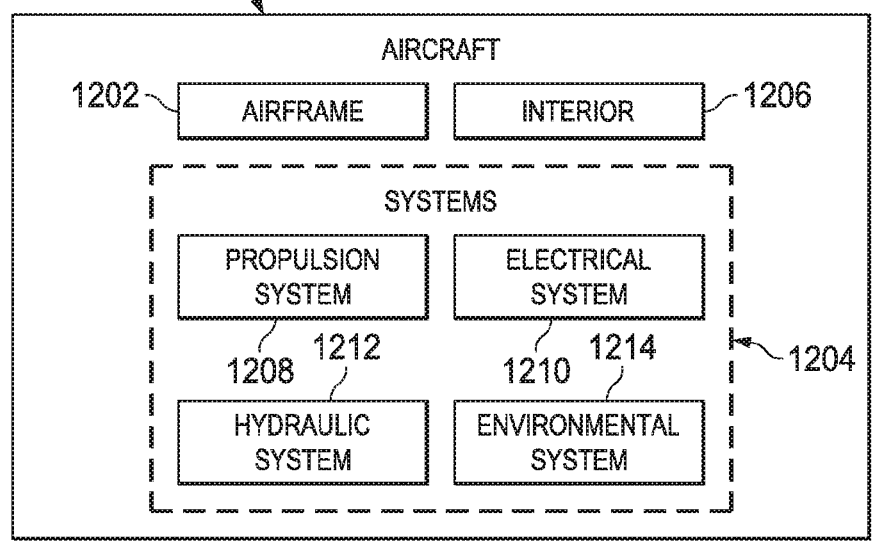

JOINING A THERMOPLASTIC MATERIAL AND A METAL

CROSS-REFERENCE TO RELATED APPLICATION(S)

This application is a divisional of and claims the benefit of priority to U.S. patent application Ser. No. 13/780,963, filed Feb. 28, 2013 and entitled "Joining a Thermoplastic Material and a Metal", the entire contents of which are incorporated herein by reference.

BACKGROUND INFORMATION

1. Field

The present disclosure relates generally to joints and, in particular to forming joints between a thermoplastic material and a metal. Still more particularly, the present disclosure relates to a method and apparatus for treating a metal to join the metal and the thermoplastic material when forming a joint.

2. Background

Aircraft are being designed and manufactured with ever increasing percentages of composite materials. Composite materials may be tough, light-weight materials created by combining two or more functional components. For example, a composite material may include reinforcing fibers bound in a polymer resin matrix. Resins used in composite materials may include thermoplastic or thermoset resins. A thermoplastic material may become soft upon heating and may harden upon cooling. A thermoplastic material may be able to be repeatedly heated and cooled. A thermoset material may become hard when heated. The fibers may be unidirectional or may take the form of a woven cloth or fabric.

In some applications, it may be desirable to join a thermoplastic material, such as a thermoplastic composite, to a metal. Currently, thermoplastic materials may be joined to metals using fasteners or adhesive. However, using fasteners to join thermoplastic materials and metals may undesirably add additional weight to a joint. Further, joint design or material properties may make fasteners undesirable.

Material characteristics of thermoplastic materials, such as surface tension, may make adhesives undesirable in thermoplastic joints. Further, material properties of an adhesive, such as degradation temperature, may cause adhesives to be undesirable in certain manufacturing processes. Therefore, it would be desirable to have a method and apparatus that takes into account at least some of the issues discussed above, as well as other possible issues.

SUMMARY

In an illustrative configuration, a method is presented. Zirconium n-propoxide is aged in a solvent to form a first part for a sol-gel solution. The first part is combined with deionized water to form a second part for the sol-gel solution. Aminoaryltrialkoxysilane is combined with an alcohol to form a third part for the sol-gel solution. The third part is combined with the second part to form a mixture for the sol-gel solution. The deionized water, or the alcohol, or a combination thereof, are combined with the mixture to form a solution. The solution is aged to form the sol-gel solution comprising a mole balance ratio of approximately 1:5 between the zirconium n-propoxide and the aminoaryltrialkoxysilane.

In another illustrative configuration, a sol-gel solution is presented. The sol-gel solution comprises zirconium n-propoxide, aminoaryltrialkoxysilane, a solvent, an alcohol, and deionized water. The sol-gel solution comprises a mole balance ratio of approximately 1:5 between the zirconium n-propoxide and the aminoaryltrialkoxysilane In yet another illustrative configuration, a sol-gel solution is presented. The sol-gel solution comprises, by mole percent, zirconium n-propoxide in the range of approximately 0.005% to approximately 8.10%, aminoaryltrialkoxysilane in the range of approximately 0.03% to approximately 44.9%, a solvent in the range of approximately 0.03% to approximately 46.1%, an alcohol in the range of approximately 3.0% to approximately 93.2%, and deionized water in the range of approximately 5.0% to approximately 98.2%, based on the total moles of the sol-gel solution.

The features and functions can be achieved independently in various configurations of the present disclosure or may be combined in yet other configurations in which further details can be seen with reference to the following description and drawings.

BRIEF DESCRIPTION OF THE DRAWINGS

The novel features believed characteristic of the illustrative configurations are set forth in the appended claims. The illustrative configurations, however, as well as a preferred mode of use, further objectives and features thereof, will best be understood by reference to the following detailed description of an illustrative configuration of the present disclosure when read in conjunction with the accompanying drawings, wherein:

FIG. 11 is an illustration of an aircraft manufacturing and service method in accordance with an illustrative configuration; and FIG. 12 is an illustration of an aircraft in which an illustrative configuration may be implemented.

DETAILED DESCRIPTION

The different illustrative configurations recognize and take into account one or more different considerations. For example, the illustrative configurations recognize and take into account adhering a thermoplastic material and a metal may be a desirable joining method. As used herein, adhering is the process of joining the thermoplastic material to a metal using temperature and pressure. The illustrative configurations recognize and take into account adhering a thermoplastic material and a metal may be a faster or lower cost method of joining a thermoplastic material and a metal than using fasteners or adhesive.

The illustrative configurations also recognize and take into account adhering a thermoplastic material to a metal may be a faster method than joining a thermoset material to a metal through curing. As a result, the illustrative configurations recognize and take into account the use of thermoplastic materials rather than thermoset materials may result in a faster or lower cost method of joining.

The illustrative configurations further recognize and take into account mechanical bonds between a thermoplastic material and metal may not provide a desirable bond. For example, a thermoplastic material and metal with only mechanical bonds may not have a desirable critical strain energy release rate, shear strength, environmental durability, or fatigue properties. As a result, the illustrative configurations recognize and take into account altering the surface chemistry of the titanium may be desirable to promote chemical bonds at the interface with the thermoplastic material.

Thus, the different illustrative configurations provide an apparatus and method for joining thermoplastic materials and metals. In particular, one or more of the different illustrative configurations provide a method for joining a thermoplastic material and a metal without increasing at least one of the weight, cost, and complexity of a platform more than desired.

Figure 1:
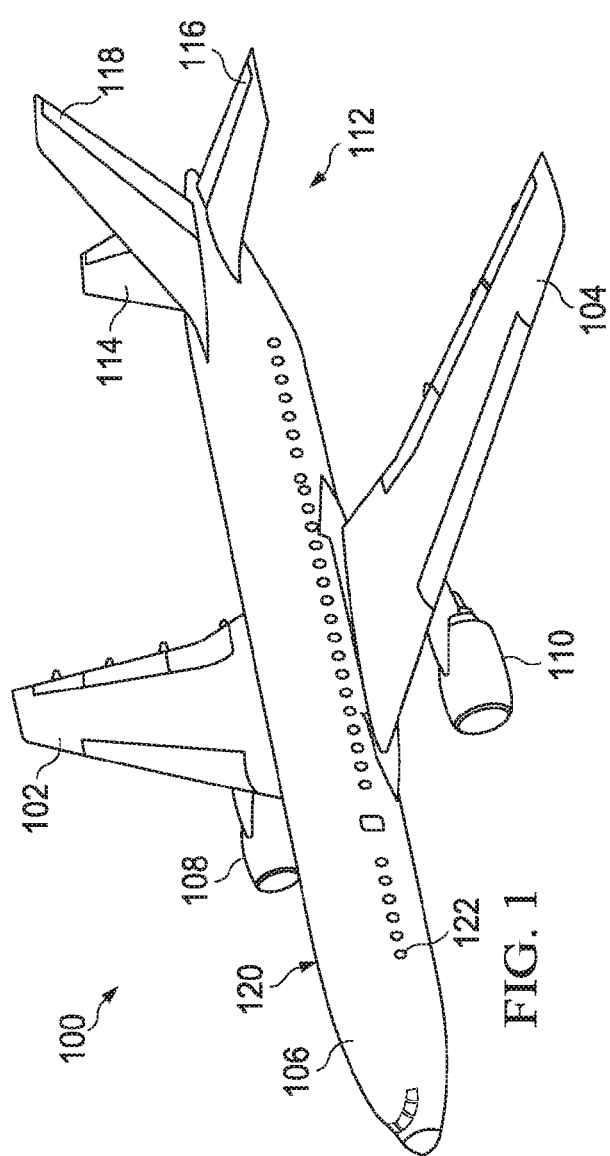
FIG. 1 is an illustration of an aircraft in which an illustrative configuration may be implemented.

With reference now to the figures, and in particular, with reference to FIG. 1, an illustration of an aircraft is depicted in accordance with an illustrative configuration. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which adhering of a thermoplastic material and a metal may be implemented in accordance with an illustrative configuration. For example, body 106 of aircraft 100 may have thermoplastic composite skin 120. Thermoplastic composite skin 120 may comprise a skin of an aircraft made from thermoplastic composite materials. Thermoplastic composite materials may include reinforcing fibers bound in a thermoplastic resin matrix. In this example, metal brackets (not shown) within body 106 may be adhered to thermoplastic composite skin 120. In another illustrative example, window 122 of aircraft 100 may have a metallic leading edge. As a result, the metallic leading edge of window 122 may be adhered to thermoplastic composite skin 120 or a thermoplastic frame of window 122.

The illustration of aircraft 100 in FIG. 1 is not meant to imply physical or architectural limitations to the manner in which an illustrative configuration may be implemented. For example, although aircraft 100 is a commercial aircraft, aircraft 100 may be a military aircraft, a rotorcraft, helicopter, unmanned aerial vehicle, or any other suitable aircraft.

Figure 2:
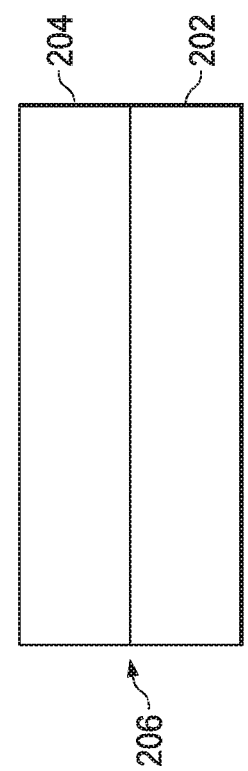
FIG. 2 is an illustration of a joint between a thermoplastic material and a metal in accordance with an illustrative configuration.

Turning now to FIG. 2, an illustration of a joint between a thermoplastic material and a metal is depicted in accordance with an illustrative configuration. Joint 200 may be one implementation of a joint between thermoplastic composite skin 120 and a metal component such as a metal bracket in FIG. 1. Joint 200 has thermoplastic material 202 and metal 204. In one illustrative example, thermoplastic material 202 may be a part made substantially of a thermoplastic. In another illustrative example, thermoplastic material 202 may be a thermoplastic composite. In this illustrative example, the thermoplastic composite may have reinforcing fibers bound in a thermoplastic resin matrix. In yet another illustrative example, thermoplastic material 202 may be a mixture in which one component is a thermoplastic.

Thermoplastic material 202 and metal 204 are joined at interface 206. Thermoplastic material 202 and metal 204 may be joined at interface 206 by adhering.

In one illustrative example, prior to adhering, metal 204 may be processed with mechanical treatments on a surface along interface 206. These mechanical treatments may include, for example, at least one of grit blasting, sanding, or other suitable treatments. In another illustrative example, prior to adhering, metal 204 may be processed with chemical treatments on a surface along interface 206. These chemical treatments may include, for example, at least one of a chemical etch or other suitable treatments. In some illustrative examples, a chemical etch may be selected from an alkaline etch or an acidic etch. In some illustrative examples, a chemical treatment may be selected from at least one of phosphoric acid anodize, boric acid anodize, sulfuric acid-sodium dichromate anodize, chromic acid anodize, phosphate-fluoride etch, or other suitable chemical etches.

The illustration of joint 200 in FIG. 2 is not meant to imply physical or architectural limitations to the manner in which an illustrative configuration may be implemented. For example, joint 200 may be a joint between two metals and a single thermoplastic. In another illustrative example, joint 200 may be a joint between two thermoplastic materials and a single metal component. In yet another illustrative example, interface 206 of joint 200 may not be perfectly planar. In further examples, thermoplastic material 202 may have a different thickness than metal 204. In a yet further examples, the thickness of at least one of thermoplastic material 202 and metal 204 may vary along the length of joint 200.

Figure 3:
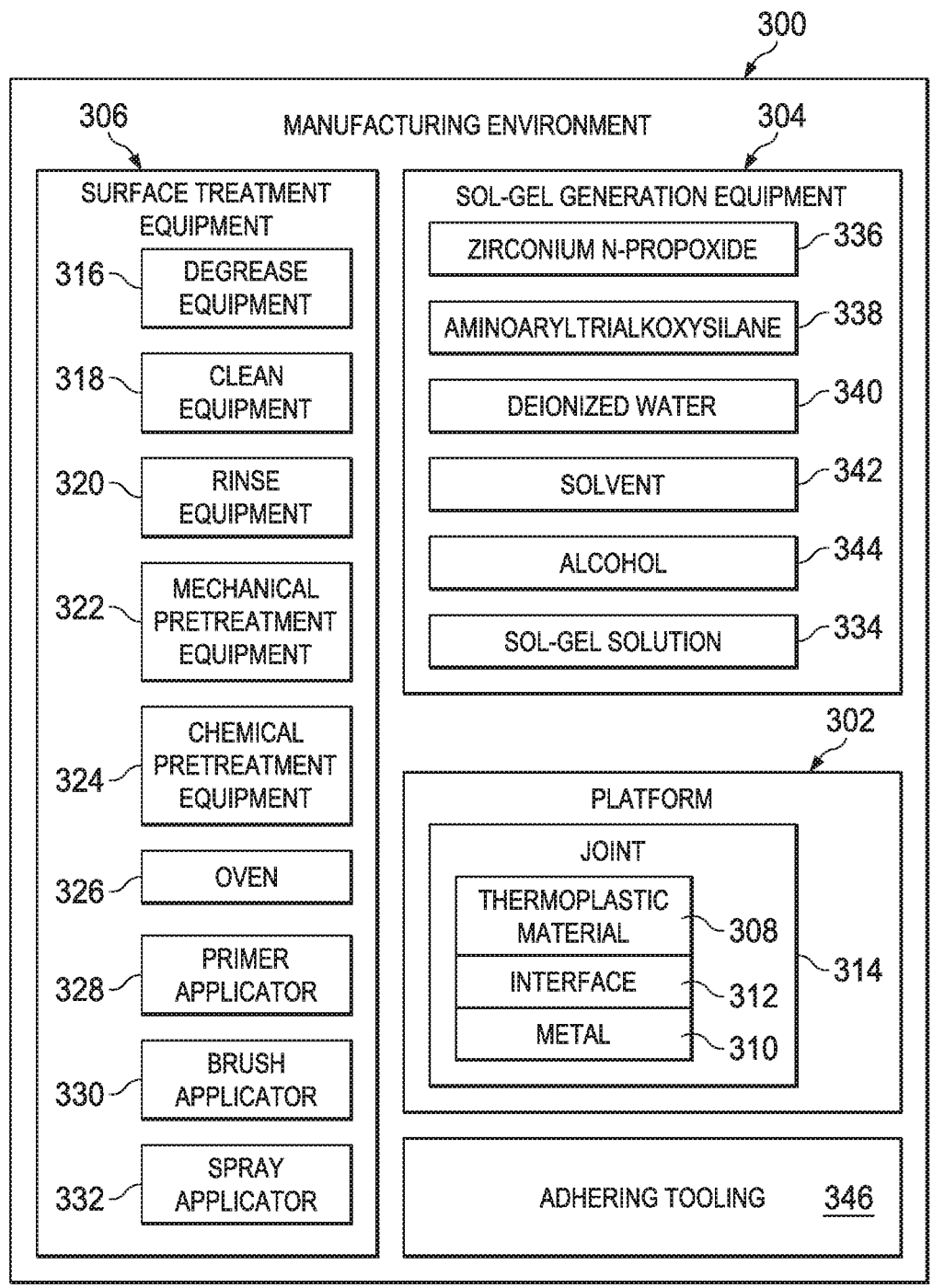
FIG. 3 is an illustration of a block diagram of a manufacturing environment in accordance with an illustrative configuration.

With reference now to FIG. 3, an illustration of a block diagram of a manufacturing environment is depicted in accordance with an illustrative configuration. Manufacturing environment 300 may be an example of an environment in which components of aircraft 100 of FIG. 1 may be manufactured, repaired, serviced, or some combination thereof.

Manufacturing environment 300 includes a number of different components. As depicted, manufacturing environment 300 includes platform 302, sol-gel generation equipment 304, and surface treatment equipment 306.

In FIG. 3, aircraft 100 in FIG. 1 is an example of one physical implementation for platform 302 in FIG. 3. Although the illustrative examples for an illustrative configuration are described with respect to an aircraft, an illustrative configuration may be applied to other types of platforms. Platform 302 may be, for example, without limitation, a mobile platform, a stationary platform, a land-based structure, an aquatic-based structure, and a space-based structure. More specifically, platform 302 may be a surface ship, a tank, a personnel carrier, a train, a spacecraft, a submarine, an automobile, a power plant, a bridge, a dam, a house, a manufacturing facility, a building, or other suitable platforms.

In this illustrative example, platform 302 has thermoplastic material 308 and metal 310 joined along interface 312. Thermoplastic material 308, metal 310, and interface 312 form joint 314 of platform 302.

Joint 314 may be formed through adhering of thermoplastic material 308 and metal 310. Thermoplastic material 308 may be chosen from the group of a polyetherimide, a polyphenylene sulfide, polyimide, a polyetherketoneketone, a polyetheretherketone, an acetal, an acrylic, a vinyl, a cellulosic, a polyamide such as Nylon, polystyrene, polysulfone, polyurethane, a polytetrafluoroethylene such as Teflon®, a polyolefin such as polyethylene, a polypropylene, a polyvinylfluoride such as Tedlar®, a polyetherimide such as Ultem®, a polyphenylsulfone, polycarbonate such as Lexan®, Declar®, or any other suitable thermoplastic material. Metal 310 may be chosen from the group of titanium, titanium alloys, aluminum alloys, nickel alloys, stainless steel alloys, copper alloys, or any other suitable metal. In one illustrative example metal 310 comprises Ti-6Al-4V, a titanium alloy.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C. The item may be a particular object, thing, or a category. In other words, at least one of means any combination of items and number of items may be used from the list but not all of the items in the list are required. In other words, at least one of item A and item B may mean item A, or item B, or a combination thereof.

In some illustrative examples, to produce desirable characteristics in joint 314, metal 310 may be surface treated. The surface treatment may include at least one of cleaning, mechanical treatment, and chemical treatment prior to adhering. Surface treatment of metal 310 may be performed by surface treatment equipment 306. As depicted, surface treatment equipment 306 includes degrease equipment 316, clean equipment 318, rinse equipment 320, mechanical pretreatment equipment 322, chemical pretreatment equipment 324, oven 326, primer applicator 328, brush applicator 330, and spray applicator 332.

Degrease equipment 316 may be configured to perform a degrease such as aqueous degrease on metal 310 as part of surface treatment of metal 310. Clean equipment 318 may perform a clean such as an alkaline clean on metal 310 as part of surface treatment of metal 310. In some illustrative configurations, clean equipment 318 may perform a clean after an aqueous degrease step on metal 310.

Rinse equipment 320 may be configured to perform a rinse on metal 310. Rinse equipment 320 may be configured to perform at least one of an immersion rinse and a spray rinse. In one illustrative example, rinse equipment 320 may perform a rinse on metal 310 after metal 310 has received at least one of a degrease step and a clean step. In some illustrative examples, rinse equipment 320 may perform a rinse on metal 310 after metal 310 has received at least one of a mechanical pretreatment such as abrasion and a chemical pretreatment such as an etch.

Mechanical pretreatment equipment 322 may be configured to perform a mechanical pretreatment on metal 310. Mechanical pretreatment equipment 322 may perform at least one of grit blasting, grinding, sanding, or any other suitable mechanical pretreatment. In one illustrative example, mechanical pretreatment equipment 322 may roughen the surface of metal 310 to promote mechanical adhesion of thermoplastic material 308 to metal 310. In another illustrative example, mechanical pretreatment equipment 322 may prepare the surface of metal 310 for application of sol-gel solution 334.

Chemical pretreatment equipment 324 may be configured to perform a chemical pretreatment on metal 310. Chemical pretreatment equipment 324 may perform at least one of an alkaline etch, an acidic etch, or other suitable chemical pretreatment.

In one illustrative example, chemical pretreatment equipment 324 may cause surface roughness on the surface of metal 310 to promote mechanical adhesion of thermoplastic material 308 to metal 310. In another illustrative example, chemical pretreatment equipment 324 may prepare the surface of metal 310 for application of sol-gel solution 334.

Oven 326 may be configured to dry metal 310 after surface treatments. In one illustrative example, oven 326 may be used to dry metal 310 after a rinse step using rinse equipment 320. In one illustrative example, oven 326 may be used to dry metal 310 after application of a material to metal 310 by brush applicator 330 or spray applicator 332.

Primer applicator 328 may be configured to apply a primer to metal 310. In one illustrative example, after oven drying sol-gel solution 334 on metal 310, a primer may be applied to metal 310 using primer applicator 328. In this illustrative example, oven 326 may be used to dry metal 310 after application of a primer by primer applicator 328.

A primer may be applied to metal 310 to change the characteristics of resulting joint 314. In some illustrative examples, a primer may be a high temperature primer. A high temperature primer may be configured to withstand elevated temperatures in the range of 150 to 800 degrees Fahrenheit. In one illustrative example, a high temperature primer may be configured to withstand the consolidation temperature of thermoplastic material 308. In one illustrative example, the high temperature primer may be configured to withstand temperatures in the range of 500 to 800 degrees Fahrenheit.

Sol-gel solution 334 may be applied to metal 310 using at least one of brush applicator 330, spray applicator 332, or any other suitable applicator. In some illustrative examples, sol-gel solution 334 may be applied to metal 310 following at least one of a degrease step, a clean, a rinse, a mechanical pretreatment, a chemical pretreatment, an oven dry, or other suitable surface treatments. In these illustrative examples, the surface treatments may prepare the surface of metal 310 for sol-gel solution 334. In these illustrative examples, the surface treatments may cause joint 314 to have desirable characteristics.

Sol-gel generation equipment 304 is configured to produce sol-gel solution 334. As used herein, sol-gel solution 334 may also be referred to as a high temperature sol-gel solution, or a sol-gel solution. Sol-gel generation equipment 304 combines zirconium n-propoxide 336, aminoaryltrialkoxysilane 338, deionized water 340, solvent 342, and alcohol 344 to form sol-gel solution 334.

Sol-gel solution 334 is a sol-gel solution configured to promote adhesion between metal 310 and thermoplastic material 308 when applied to metal 310 prior to adhering. A sol-gel solution is a solution created through a solution-gelation reaction. A solution-gelation reaction is a wet-chemical technique comprising hydrolysis and condensation reactions. A sol-gel solution may comprise a soluble metal alkoxide precursor with functional side groups. In some illustrative examples, a sol-gel solution may be used for at least one of attaching and coating.

As used herein, attaching may be an attachment at an interface, such as interface 312. Sol-gel solution 334 may promote adhesion by chemical interactions at interface 312. Chemical reactions encouraged by sol-gel solution 334 may not include cross-linking. Chemical reactions to promote adhesion may be selected from at least one of van der Waals interactions, acid-base interactions, or other suitable chemical reactions. In some illustrative examples, sol-gel solution 334 promotes adhesion by secondary chemical bonds.

Sol-gel solution 334 is also configured to withstand high temperatures. During adhering of metal 310 and thermoplastic material 308, sol-gel solution 334 may be exposed to the consolidation temperature of thermoplastic material 308. The consolidation temperature of thermoplastic material 308 may be in the range of 150 to 800 degrees Fahrenheit. In some illustrative examples, a consolidation temperature of thermoplastic material 308 may be in the range of 500 to 800 degrees Fahrenheit. As a result, sol-gel solution 334 is configured to withstand the consolidation temperature of thermoplastic material 308.

In some illustrative examples, sol-gel solution 334 may also be configured to prevent metal 310 from at least one of forming an oxide layer, material changes over time, and material degradation. In these illustrative examples, sol-gel solution 334 may function as a sealant for the surface of metal 310.

Sol-gel solution 334 has a desired pH range that is slightly acidic. In some illustrative examples, the pH of sol-gel solution 334, without adjustment, is between 4 to 5. However, in other illustrative examples the pH of sol-gel solution 334 may vary from 3 to 6.

In one illustrative example, a series of steps are followed to produce sol-gel solution 334. In generating sol-gel solution 334, solubility of components is influenced by the order of mixing techniques, length of mixing techniques, and type of mixing techniques. As a result, the mixing techniques affect the outcome of sol-gel solution 334. The mixing techniques include at least one of stirring, swirling, and aging steps.

Sol-gel solution 334 may be created in manufacturing environment 300, or any other suitable environment having the necessary materials and equipment. However, sol-gel solution 334 has a limited pot life, varying from 1 hour to 12 hours. A pot life may be the period of time a sol-gel solution remains suitable for its intended processing after the sol-gel solution is produced.

In the illustrative example, alcohol 344 may be a low molecular weight alcohol. As used herein, a low molecular weight alcohol is an alcohol which has a low molecular weight and evaporates at room temperature or at slightly elevated temperature. Additionally, a low molecular weight alcohol also may not leave an undesired amount of residue on a surface on which the low molecular weight alcohol is applied. Alcohol 344 may be selected from the group of isopropyl alcohol, methanol, ethanol, propanol, n-butanol (1-butanol), sec-butanol (2-butanol), isobutanol (2-methyl-1-propanol), tert-butanol (2-methoyl-2-propanol), and 3-methyl-2-butanol, or other suitable low molecular weight alcohols.

Solvent 342 acts to catalyze the reaction. Solvent 342 also keeps zirconium n-propoxide 336 in solution. In one illustrative example, solvent 342 may affect the pH of sol-gel solution 334. Solvent 342 may be selected from the group of glycols, glycol ethers, glacial acetic acid, butyl ester, or other suitable catalysts. A reaction between solvent 342 and zirconium n-propoxide 336 may be somewhat exothermic.

Manufacturing environment 300 also has adhering tooling 346. Adhering tooling 346 is configured to perform an adhering process on thermoplastic material 308 and metal 310. After application of sol-gel solution 334 to a surface of metal 310, thermoplastic material 308 may be positioned in contact with the surface of metal 310. This positioning may be referred to as assembling. Thermoplastic material 308 and metal 310 may then go through an adhering process using adhering tooling 346.

In some illustrative examples, thermoplastic material 308 may be unconsolidated. In these illustrated examples, adhering tooling 346 may be used to substantially simultaneously consolidate thermoplastic material 308 and adhere thermoplastic material 308 to metal 310. In one illustrative example, the consolidation and adhering may take place in a single cycle of heat and pressure. In another illustrative example, the consolidation and adhering may take place in a plurality of cycles of heat and pressure.

In some illustrative examples, thermoplastic material 308 may be pre-consolidated. In these illustrative examples, adhering tooling 346 may be used to adhere thermoplastic material 308 to metal 310.

In some illustrative examples, thermoplastic material 308 may be partially consolidated. In these illustrative examples, adhering tooling 346 may be used to complete consolidation of thermoplastic material 308 and to adhere thermoplastic material 308 to metal 310.

Adhering tooling 346 may be selected from at least one of an autoclave, a press, a heating iron, clamps, localized heating equipment, or any other suitable tooling configured to supply elevated temperature and pressure. After adhering of thermoplastic material 308 and metal 310, joint 314 with interface 312 is formed.

In some illustrative examples, thermoplastic material 308 is positioned in contact with the surface of metal 310 after application of a primer to the surface of metal 310. As a result, the properties of resulting joint 314 are affected by the primer between thermoplastic material 308 and metal 310.

The illustration of manufacturing environment 300 in FIG. 3 is not meant to imply physical or architectural limitations to the manner in which an illustrative configuration may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative configuration.

For example, metal 310 may not receive a mechanical pretreatment. In this illustrative example, mechanical pretreatment equipment 322 may not be present in manufacturing environment 300. In another illustrative example, sol-gel solution 334 may be exclusively sprayed onto metal 310. In this illustrative example, brush applicator 330 may not be present in manufacturing environment 300.

Figure 4:
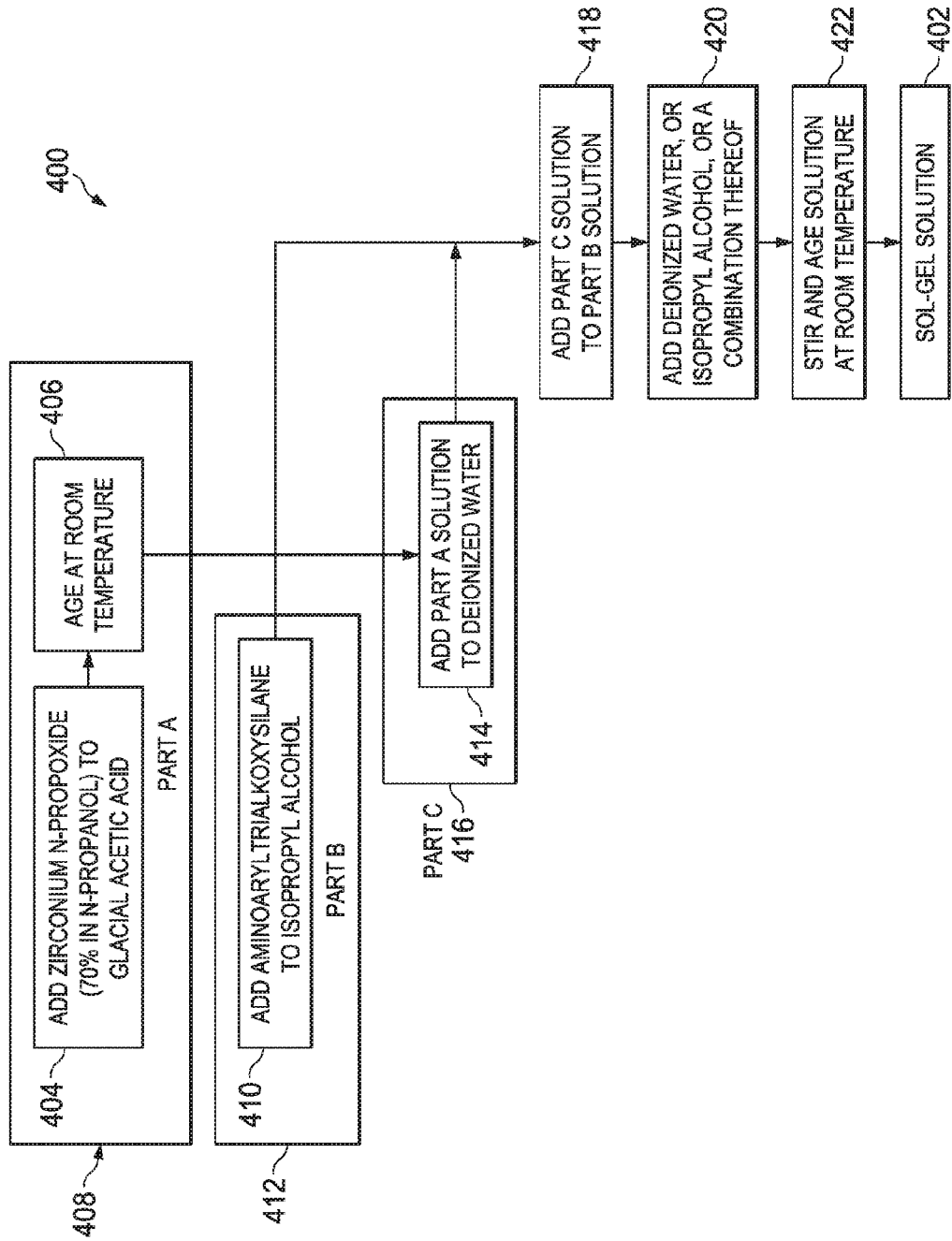
FIG. 4 is an illustration of a process flow of a process for generating a sol-gel solution in accordance with an illustrative configuration.

Turning now to FIG. 4, an illustration of a process flow of a process for generating a sol-gel solution is depicted in accordance with an illustrative configuration. Process 400 may be implemented in manufacturing environment 300 of FIG. 3 to create sol-gel solution 334.

Process 400 creates sol-gel solution 402. Sol-gel solution 402 may be sol-gel solution 334 of FIG. 3. Sol-gel solution 402 is configured to withstand the consolidation temperature of a thermoplastic material, such as thermoplastic material 308 of FIG. 3. Sol-gel solution 402 is configured to promote adhesion between a metal, such as metal 310, and a thermoplastic material, such as thermoplastic material 308 when applied to the metal prior to adhering. Sol-gel solution 402 may promote adhesion by chemical interactions at an interface between the metal and the thermoplastic material.

The process begins by combining zirconium n-propoxide and glacial acetic acid. In this illustrative example, the zirconium n-propoxide is provided 70% in n-propanol. In this illustrative example, zirconium n-propoxide is added to glacial acetic acid (operation 404). In this process, glacial acetic acid acts as a solvent for zirconium n-propoxide. Glacial acetic acid may be solvent 342 of FIG. 3. As described in more detail below, the amount of zirconium n-propoxide and glacial acetic acid combined may vary based on desired composition of sol-gel solution 402. However, a mole balance ratio of approximately 1:1 is maintained for the zirconium n-propoxide and glacial acetic acid. A mole balance ratio as used herein is a ratio between the amounts, in moles, of two substances in the sol-gel solution. A mole is a unit of measure used to express an amount of a chemical substance. A mole is as many elementary entities as there are atoms in 12 grams of pure carbon-12, a value of approximately $6.02214179(30)*10^{23}$. In one illustrative example, approximately 2.00 mL of zirconium n-propoxide 70% in n-propanol is added to approximately 1.46 mL of glacial acetic acid.

Next the zirconium n-propoxide and glacial acetic acid are aged at room temperature (operation 406). This operation forms part A 408. Prior to aging, the zirconium n-propoxide and glacial acetic acid may be swirled. Swirling may be performed by moving the container containing the zirconium n-propoxide and glacial acetic acid in a circular pattern. Swirling mixes the ingredients within the container. Swirling is performed to allow the reaction to occur evenly. In some illustrative examples, the zirconium n-propoxide and glacial acetic acid may be stirred instead of swirled. Following swirling, the zirconium n-propoxide and glacial acetic acid are then aged at room temperature. In some illustrative examples, after swirling or stirring the zirconium n-propoxide and glacial acetic acid, a foil or other reflective surface may be placed over the opening of the container.

The mixture of zirconium n-propoxide and glacial acetic acid are then set aside to age. As used herein, aging is used to describe a passage of time. In one illustrative example, the zirconium n-propoxide and glacial acetic acid may be aged for approximately twenty to thirty minutes.

The process combines aminoaryltrialkoxysilane and isopropyl alcohol. In this illustrative example, the process adds aminoaryltrialkoxysilane to isopropyl alcohol to form part B 412 (operation 410). Isopropyl alcohol may be alcohol 344 of FIG. 3. The result of this addition is a functionalized silane. The chemistry of sol-gel solution 402 requires a minimum amount of isopropyl alcohol. The minimum amount of isopropyl alcohol may be expressed as a minimum mole balance ratio of approximately 18:1 between isopropyl alcohol and aminoaryltrialkoxysilane. In one illustrative example, approximately 5.60 mL of aminoaryltrialkoxysilane is added to approximately 40 mL of isopropyl alcohol. After the aminoaryltrialkoxysilane is added to the isopropyl alcohol, this mixture is stirred. Stirring mixes the ingredients within the container. Stirring may be performed to allow the reaction to occur evenly. In some illustrative examples, stirring may be performed to improve or to maintain the solubility of a mixture. Stirring may be performed using a magnetic stir bar, pump, impeller, or other suitable stirring mechanism.

After aging for approximately twenty to approximately thirty minutes, part A 408 and deionized water are combined. In this illustrative example, part A 408 is added to deionized water to form part C 416 (operation 414). In some illustrative examples, a small amount of deionized water may first be added to part A 408 and swirled, prior to adding part A 408 to deionized water to form part C 416. In these illustrative examples, this small amount of deionized water and swirling may prepare part A 408 for addition to deionized water. In these illustrative examples, this small amount of deionized water may discourage the zirconium n-propoxide from falling out of solution upon addition to the deionized water to form part C 416. In these illustrative examples, this small amount of deionized water may range from a few drops of deionized water to a few mL of deionized water.

As described in further detail below, the amount of deionized water in sol-gel solution 402 may vary based on desired composition of sol-gel solution 402. However, the sol-gel solution 402 has a minimum amount of deionized water. The minimum amount of deionized water may be expressed as a minimum mole balance ratio of approximately 18:1 between deionized water and zirconium n-propoxide.

In one illustrative example, part A 408 is added to approximately 70 mL of deionized water. After adding part A 408 to the deionized water, the mixture is stirred. Stirring may be performed to promote solubility and to maintain components suspended in solution.

Next the process combines part C 416 and part B 412. In this illustrative example, the process adds part C 416 into part B 412 (operation 418). In one illustrative example, the process may slowly pour part C 416 into part B 412. Deionized water, or isopropyl alcohol, or a combination thereof is added to part B 412 and part C 416 (operation 420). In some illustrative examples, during this step, at least one of the deionized water and the isopropyl alcohol can be used to rinse any residue of part C 416 from the vessel part C 416 was poured from into the vessel holding part B 412 and part C 416. The amount of deionized water and isopropyl alcohol may vary so long as the amount of deionized water and isopropyl alcohol meets the minimum mole balance ratios. In some illustrative examples, this addition of deionized water, or isopropyl alcohol, or a combination thereof may result in a concentration that is desirable for spray application. In one illustrative example, the addition includes approximately 320 mL of deionized water and approximately 60 mL of isopropyl alcohol.

Next the solution is stirred and aged at room temperature (operation 422). In one illustrative example, the solution may be aged for thirty minutes to five hours while stirring. Following operation 422, sol-gel solution 402 is ready for application to a metal. The pot life of sol-gel solution 402 may range from 1 to 12 hours. A pot life may be the period of time a sol-gel solution remains suitable for its intended processing after the sol-gel solution is produced.

Resultant sol-gel solution 402 may contain, by mole percent, zirconium n-propoxide in the range of approximately 0.005% to approximately 8.10%, aminoaryltrialkoxysilane in the range of approximately 0.03% to approximately 44.9%, a solvent in the range of approximately 0.03% to approximately 46.1%, an alcohol in the range of approximately 3.0% to approximately 93.2%, and deionized water in the range of approximately 5.0% to approximately 98.2%, based on the total moles of the sol-gel solution. As used herein, a mole percent of a substance is the ratio of the moles of the substance in the sol-gel to the moles of the sol-gel. In one illustrative example, desirable mole percent ranges for sol-gel solution 402 may be zirconium n-propoxide in a range of approximately 0.01% to approximately 0.03%, aminoaryltrialkoxysilane in a range of approximately 0.09% to approximately 0.13%, solvent in a range of approximately 0.09% to approximately 0.20%, alcohol in a range of approximately 5.0% to approximately 6.2%, and deionized water in a range of approximately 84.0% to approximately 98.0%, based on the total moles of the sol-gel solution. In another illustrative example, the mole percent values for the components may be as follows: approximately 0.0195% zirconium n-propoxide, approximately 0.108% aminoaryltrialkoxysilane, approximately 0.111% solvent, approximately 5.62% alcohol, and approximately 94.14% deionized water based on the total moles of the sol-gel solution.

Figure 5:
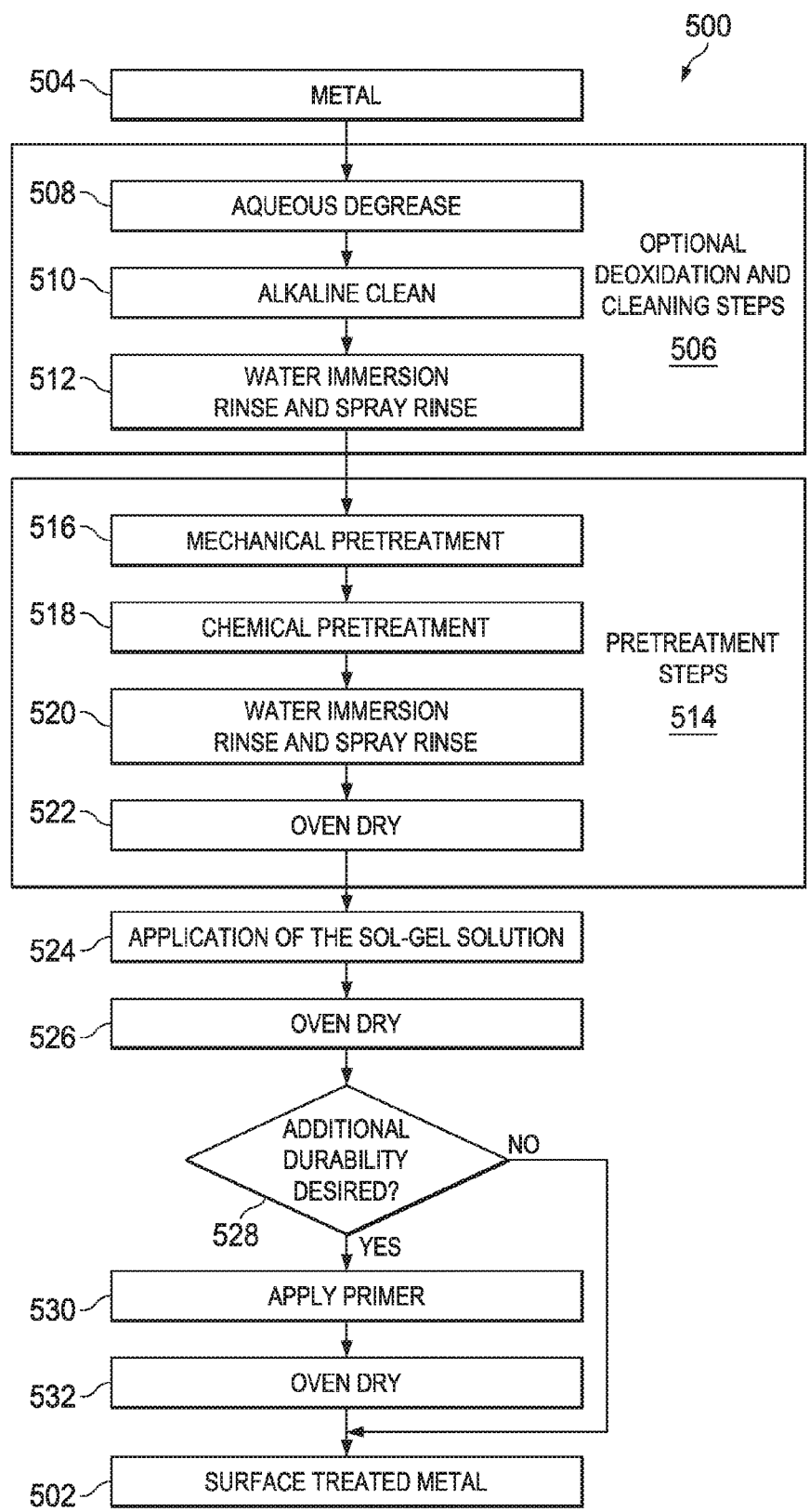
FIG. 5 is an illustration of a process flow of a process for treating a metal in accordance with an illustrative configuration.

With reference now to FIG. 5, an illustration of a process flow of a process for treating a metal is depicted in accordance with an illustrative configuration. Process 500 may be implemented by surface treatment equipment 306 in manufacturing environment 300 of FIG. 3 to treat a metal such as metal 310.

Process 500 results in surface treated metal 502. Metal 504 may go through optional deoxidation and cleaning steps 506. Optional deoxidation and cleaning steps 506 include aqueous degrease 508, alkaline clean 510, and water immersion rinse and spray rinse 512. In some illustrative examples, at least one of aqueous degrease 508, alkaline clean 510, and water immersion rinse and spray rinse 512 may be performed on metal 504. In some illustrative examples, none of aqueous degrease 508, alkaline clean 510, and water immersion rinse and spray rinse 512 are performed. In some illustrative examples, whether optional deoxidation and cleaning steps 506 will be performed is determined based on at least one of the material properties of metal 504, any required properties of a resulting joint, or other suitable considerations.

Next, metal 504 may go through pretreatment steps 514. Pretreatment steps 514 include mechanical pretreatment 516, chemical pretreatment 518, water immersion rinse and spray rinse 520, and oven dry 522. Mechanical pretreatment 516 may include at least one of grit blasting, grinding, sanding, or any other suitable mechanical pretreatment. Chemical pretreatment 518 may include at least one of an alkaline etch, an acidic etch, or other suitable chemical pretreatment.

In some illustrative examples, at least one of mechanical pretreatment 516, chemical pretreatment 518, water immersion rinse and spray rinse 520, and oven dry 522 may be performed. In other illustrative examples, none of mechanical pretreatment 516, chemical pretreatment 518, water immersion rinse and spray rinse 520, and oven dry 522 may be performed.

Next, metal 504 goes through application of the sol-gel solution 524. Sol-gel solution 524 may be applied through brushing, rolling, spraying, or other suitable application process. In one illustrative example, application of sol-gel solution 524 to metal 504 is performed using at least one of brush applicator 330 and spray applicator 332 of FIG. 3. After application of sol-gel solution 524, the sol-gel solution on metal 504 is oven dried 526.

Following an oven dry, a determination is made whether additional durability is desired for the joint 528. Desired durability of a joint may be dependent upon at least one of the type of materials in the joint, the location of the joint, the intended use for the joint, or any other suitable characteristic of the joint. In one illustrative example, this determination compares an estimated durability value for a joint including a thermoplastic material and metal 504 with the received surface treatment to a desired durability. If the desired durability is determined to be greater than the estimated durability value, the process moves to operation 530. If the desired durability is determined to not be greater than the estimated durability value, the process is complete and results in surface treated metal 502.

If additional durability is determined to be desired, a primer is applied to metal 504 (operation 530). In some illustrative examples, the primer may be a high temperature primer. In these illustrative examples, a high temperature primer may be configured to withstand consolidation temperatures of thermoplastic materials. After application of the primer, the primer on metal 504 is oven dried (operation 532). This oven dry results in surface treated metal 502.

Figure 6:
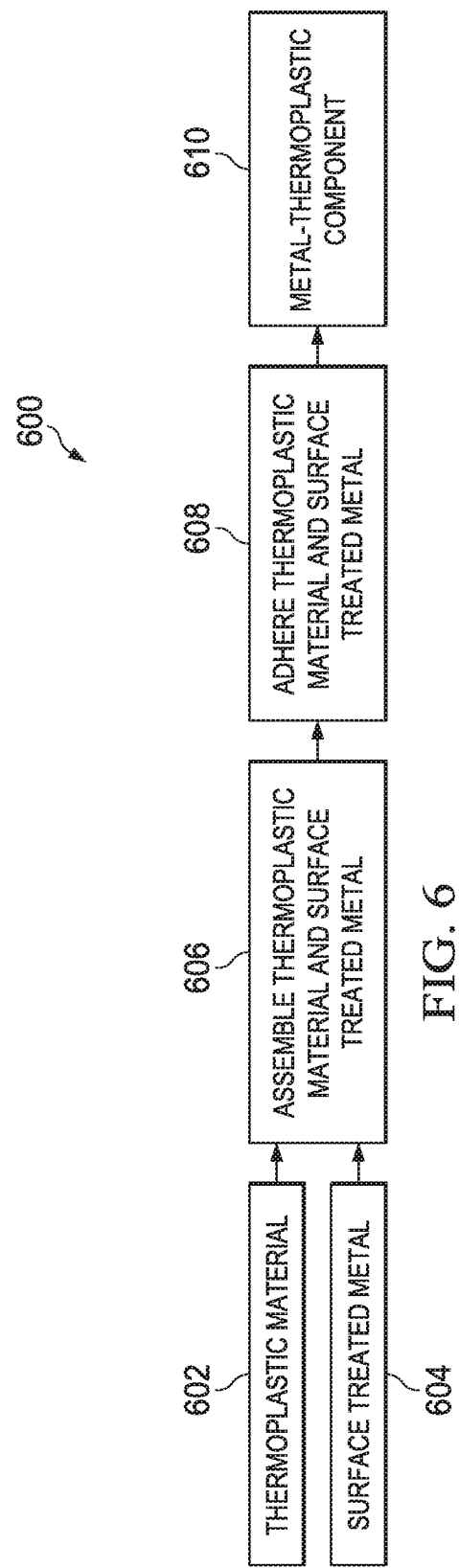
FIG. 6 is an illustration of a process flow of a process for creating a joint between a thermoplastic material and a metal in accordance with an illustrative configuration.

Turning now to FIG. 6, an illustration of a process flow of a process for creating a joint between a thermoplastic material and a metal is depicted in accordance with an illustrative configuration. Process 600 may be implemented in manufacturing environment 300 of FIG. 3 to create joint 314.

Thermoplastic material 602 and surface treated metal 604 enter process 600. Thermoplastic material 602 may be thermoplastic material 308 of FIG. 3. Surface treated metal 604 may be metal 310 of FIG. 3 with at least one treatment from process 500 of FIG. 5. In one illustrative example, surface treated metal 604 has received mechanical pretreatment, chemical pretreatment, water immersion rinse and spray rinse, oven dry, application of sol-gel solution, and oven dry.

Process 600 assembles thermoplastic material 602 and surface treated metal 604 (operation 606). In assembling thermoplastic material 602 and surface treated metal 604, thermoplastic material 602 and surface treated metal 604 may be positioned relative to each other as desired for a joint. During assembly, thermoplastic material 602 and surface treated metal 604 may be positioned relative to each other by hand or by using equipment. In one illustrative example, thermoplastic material 602 may be a thermoplastic composite in the form of a tape. In this illustrative example, thermoplastic material 602 may be positioned relative to surface treated metal 604 by laying down the thermoplastic composite tape on surface treated metal 604.

Next, the process adheres thermoplastic material 602 and surface treated metal 604 (operation 608). Adhering joins thermoplastic material 602 and surface treated metal 604 without the use of an adhesive or fasteners. Adhering includes the application of both heat and pressure to thermoplastic material 602 and surface treated metal 604. Adhering may be performed by at least one of an autoclave, a press, a heating iron, clamps, local heating equipment, or any other suitable adhering equipment.

Afterwards, the adhering tooling is removed, resulting in metal-thermoplastic component 610. Metal-thermoplastic component 610 has a joint which may exhibit desirable adhesion. Further, metal-thermoplastic component 610 may result in desirable material properties in mechanical tests.

Figure 7:
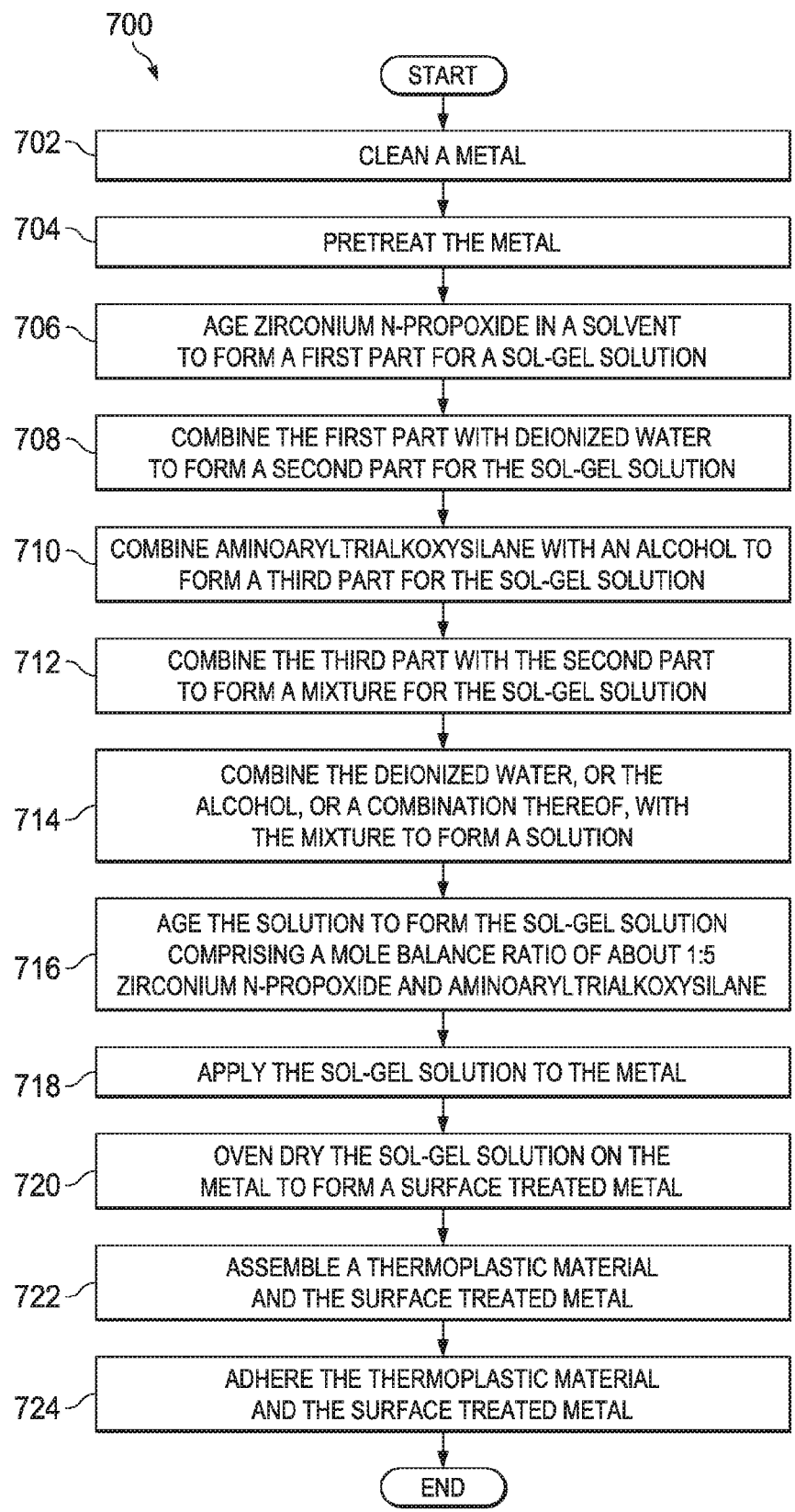
FIG. 7 is an illustration of a flowchart of a process for creating a joint between a thermoplastic material and a metal in accordance with an illustrative configuration.

With reference now to FIG. 7, an illustration of a flowchart of a process for creating a joint between a thermoplastic material and a metal is depicted in accordance with an illustrative configuration. Process 700 may be implemented in manufacturing environment 300 of FIG. 3 to create joint 314.

Process 700 begins by cleaning a metal (operation 702). In some illustrative examples, cleaning the metal may include at least one of an aqueous degrease, an alkaline clean, and a water immersion rinse and spray rinse. Next, process 700 pretreats the metal (operation 704). In some illustrative examples, pretreating the metal may include at least one of mechanical pretreatment, chemical pretreatment, water immersion rinse and spray rinse, and oven dry.

Process 700 next ages zirconium n-propoxide in a solvent to form a first part for a sol-gel solution (operation 706). In some illustrative examples, the solvent may be glacial acetic acid. The zirconium n-propoxide in the solvent is aged until the reaction is complete. In one illustrative example, the zirconium n-propoxide in the solvent is aged for approximately twenty to thirty minutes.

After aging, process 700 combines the first part with deionized water to form a second part for the sol-gel solution (operation 708). The process combines aminoaryltrialkoxysilane with an alcohol to form a third part for the sol-gel solution (operation 710). Afterwards, the third part is combined with the second part to form a mixture for the sol-gel solution (operation 712). Next, the deionized water, or the alcohol, or a combination thereof, is combined with the mixture to form a solution (operation 714). The at least one of deionized water and the alcohol may be added to result in a solution with a desirable range of components. In one illustrative example, the at least one of deionized water and the alcohol may be added to dilute the solution to a concentration that is desirable for spraying.

After adding at least one of deionized water and the alcohol, the solution is aged to form the sol-gel solution comprising a mole balance ratio of approximately 1:5 zirconium n-propoxide and aminoaryltrialkoxysilane (operation 716). The solution may be aged, while stirring, until a sol-gel solution results. The resulting sol-gel solution comprises a mole balance ratio of approximately 1:5 zirconium n-propoxide and aminoaryltrialkoxysilane. In one illustrative example, aging may take place for approximately 0.5 to 5.0 hours. In one illustrative example, aging takes place for approximately four hours. In this illustrative example, aging the solution to form the sol-gel comprises stirring the solution for four hours at room temperature.

The resulting sol-gel solution is then applied to the metal (operation 718). In some illustrative examples, the sol-gel solution may be applied to the metal by at least one of spraying and brushing. In these illustrative examples, the sol-gel solution may be applied to the metal using at least one of brush applicator 330 and spray applicator 332 of FIG. 3. The sol-gel solution need not be immediately applied to the metal after sol-gel generation, however, the sol-gel solution has a pot-life between approximately 1 and 12 hours. The sol-gel solution must be applied to the metal within this pot-life.

After application of the sol-gel, the sol-gel solution on the metal is oven dried to form a surface treated metal (operation 720). Next, the thermoplastic material and the surface treated metal are assembled (operation 722). The thermoplastic material and the surface treated material may be assembled in a desirable arrangement for a resulting metal-thermoplastic component. In assembling the thermoplastic material and the surface treated material, the thermoplastic material is positioned in contact with a treated surface of the surface treated metal.

Lastly, the thermoplastic material and the surface treated metal are adhered (operation 724). Adhering results in a metal-thermoplastic component with a joint. The joint does not include any fasteners or adhesive. Rather, the joint is formed by chemical interactions between the surface treated metal and the thermoplastic material. In some illustrative examples in which operation 704 includes mechanical pretreatment, the joint may also include mechanical interactions between the surface treated metal and the thermoplastic material.

Figure 8:
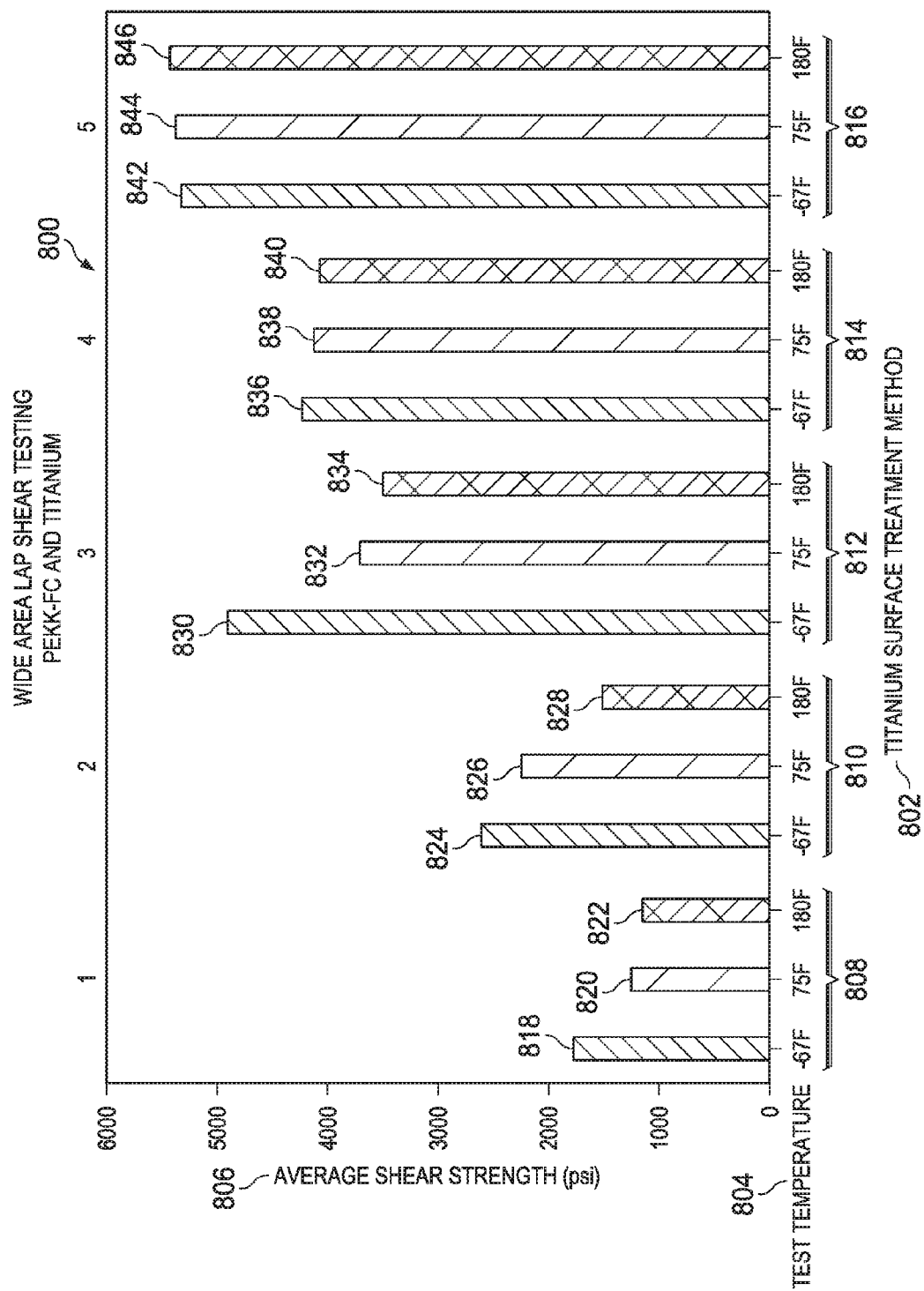
FIG. 8 is an illustration of a bar chart of testing results in accordance with an illustrative configuration.

Turning now to FIG. 8, an illustration of a bar chart of testing results is depicted in accordance with an illustrative configuration. FIG. 8 is an example of shear data for a joint, such as joint 314 shown in block form in FIG. 3. Bar chart 800 has x-axis 802, x-axis 804, and y-axis 806. As depicted, x-axis 802 represents the type of surface treatment applied to the metal within the joint. X-axis 804 represents the temperature at which the shear test is performed. Shear tests were performed at approximately −65 to approximately −67 degrees Fahrenheit, approximately 75 degrees Fahrenheit, and approximately 180 degrees Fahrenheit. Y-axis 806 represents the shear strength of the joint.

Bar chart 800 contains data from a wide area lap shear test of joints. In each joint, the thermoplastic material is a PEKK-FC thermoplastic composite. The PEKK-FC thermoplastic composite was applied as a thermoplastic tape. The PEKK-FC thermoplastic composite tape was applied between two pieces of metal. The two pieces of metal are titanium alloys, specifically Ti-6Al-4V.

Reference numeral 1 808 represents a joint in which the metal received a clean followed by a mechanical pretreatment, specifically a grit blast. Bar 818 represents a joint having the surface treatment of reference numeral 1 808 shear tested at approximately −67 degrees Fahrenheit. As depicted, bar 818 is approximately 1750 psi shear strength. Bar 820 represents a joint having the surface treatment of reference numeral 1 808 shear tested at approximately 75 degrees Fahrenheit. As depicted, bar 820 is approximately 1250 psi shear strength. Bar 822 represents a joint having the surface treatment of reference numeral 1 808 shear tested at approximately 180 degrees Fahrenheit. As depicted, bar 822 is approximately 1100 psi shear strength.

Reference numeral 2 810 represents a joint in which the metal received a clean followed by a chemical pretreatment, specifically a nitric-fluoride etch. Bar 824 represents a joint having the surface treatment of reference numeral 2 810 shear tested at approximately −67 degrees Fahrenheit. As depicted, bar 824 is approximately 2600 psi shear strength. Bar 826 represents a joint having the surface treatment of reference numeral 2 810 shear tested at approximately 75 degrees Fahrenheit. As depicted, bar 826 is approximately 2250 psi shear strength. Bar 828 represents a joint having the surface treatment of reference numeral 2 810 shear tested at approximately 180 degrees Fahrenheit. As depicted, bar 828 is approximately 1500 psi shear strength.

Reference numeral 3 812 represents a joint in which the metal received a chemical pretreatment, specifically a nitric-fluoride etch, followed by application of an alkaline etch at elevated temperatures. Bar 830 represents a joint having the surface treatment of reference numeral 3 812 shear tested at approximately −67 degrees Fahrenheit. As depicted, bar 830 is approximately 4800 psi shear strength. Bar 832 represents a joint having the surface treatment of reference numeral 3 812 shear tested at approximately 75 degrees Fahrenheit. As depicted, bar 832 is approximately 3600 psi shear strength. Bar 834 represents a joint having the surface treatment of reference numeral 3 812 shear tested at approximately 180 degrees Fahrenheit. As depicted, bar 834 is approximately 3500 psi shear strength.

Reference numeral 4 814 represents a joint in which the metal received a chemical pretreatment, specifically a nitric-fluoride etch, followed by application of TiBoe and a conventional sol-gel. In this illustrative example, the conventional sol-gel has a different coupling agent than a sol-gel solution of the current application such as sol-gel solution 334 of FIG. 3. Specifically, a conventional sol-gel does not comprise an aminoaryltrialkoxysilane, as in sol-gel solution 334 of FIG. 3.

Bar 836 represents a joint having the surface treatment of reference numeral 4 814 shear tested at approximately −67 degrees Fahrenheit. As depicted, bar 836 is approximately 4200 psi shear strength. Bar 838 represents a joint having the surface treatment of reference numeral 4 814 shear tested at approximately 75 degrees Fahrenheit. As depicted, bar 838 is approximately 4100 psi shear strength. Bar 840 represents a joint having the surface treatment of reference numeral 4 814 shear tested at approximately 180 degrees Fahrenheit. As depicted, bar 840 is approximately 4100 psi shear strength.

As depicted, a joint having the surface treatment of reference numeral 4 814 has substantially similar results across the three testing temperatures. Further, as depicted, a joint having the surface treatment of reference numeral 4 814 has higher shear strength at positive temperatures than reference numeral 1 808, reference numeral 2 810, and reference numeral 3 812, which did not receive a high temperature sol-gel solution application.

Reference numeral 5 816 represents a joint in which the metal received a chemical pretreatment, specifically a nitric-fluoride etch, followed by a mechanical pretreatment, specifically a grit blast, followed by an application of TiBoe, and an application of a high temperature sol-gel solution, such as sol-gel solution 334 of FIG. 3. Bar 842 represents a joint having the surface treatment of reference numeral 5 816 shear tested at approximately −67 degrees Fahrenheit. As depicted, bar 842 is approximately 5300 psi shear strength. Bar 844 represents a joint having the surface treatment of reference numeral 5 816 shear tested at approximately 75 degrees Fahrenheit. As depicted, bar 844 is approximately 5350 psi shear strength. Bar 846 represents a joint having the surface treatment of reference numeral 5 816 shear tested at approximately 180 degrees Fahrenheit. As depicted, bar 846 is approximately 5400 psi shear strength.

As depicted, a joint having the surface treatment of reference numeral 5 816 has substantially similar results across the three testing temperatures. Further, as depicted, a joint having the surface treatment of reference numeral 5 816 has higher shear strength at all testing temperatures than the other surface treatments.

Figure 9:
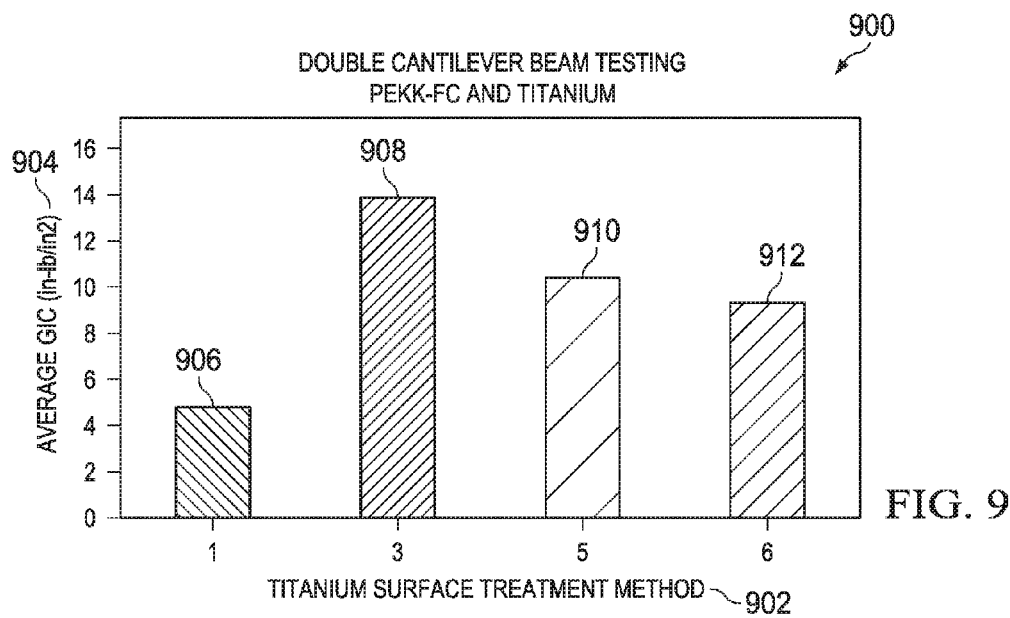
FIG. 9 is an illustration of a bar chart of testing results in accordance with an illustrative configuration.

Turning now to FIG. 9, an illustration of a bar chart of testing results is depicted in accordance with an illustrative configuration. FIG. 9 is an example of double cantilever beam testing data for a joint, such as joint 314 shown in block form in FIG. 3. Bar chart 900 has x-axis 902 and y-axis 904. As depicted, x-axis 902 represents the type of surface treatment applied to the metal within the joint. Similarly, y-axis 904 represents the GIC or the critical strain energy release rate of the joint. The critical strain energy release rate may characterize the toughness of a joint. The critical strain energy release rate may be the energy per unit area of crack surface.

Bar chart 900 contains data from a double cantilever beam test of joints. A metal component and a thermoplastic component are connected in each joint. In each joint, the thermoplastic material is a PEKK-FC thermoplastic composite. The metal is a titanium alloy, specifically Ti-6Al-4V.

Reference numeral 1 906 represents a joint having a metal receiving a surface treatment identical to that of reference numeral 1 808 of FIG. 8. As depicted, the GIC of reference numeral 1 906 is approximately 5 in-lb/in$^2$.

Reference numeral 3 908 represents a joint having a metal receiving a surface treatment identical to that of reference numeral 3 812 of FIG. 8. As depicted, the GIC of reference numeral 3 908 is significantly higher than reference numeral 1 906. Specifically, the GIC of reference numeral 3 908 is approximately 13.8 in-lb/in$^2$. Further, in these limited tests, the joint for reference numeral 3 908 exhibited no adhesion failure. In other words, 100% of the failure was interlaminar failure in the thermoplastic composite.

Reference numeral 5 910 represents a joint having a metal receiving a surface treatment identical to that of reference numeral 5 816 of FIG. 8. As depicted, the GIC of reference numeral 5 910 is approximately 10.3 in-lb/in$^2$. Like the joint for reference numeral 3 908, in these limited tests, the joint for reference numeral 5 910 exhibited no adhesion failure. As both reference numeral 3 908 and reference numeral 5 910 failed due to interlaminar failure modes, these values should be compared with caution.

Reference numeral 6 912 represents a joint in which the metal received a chemical pretreatment, specifically a nitric-fluoride etch, followed by a mechanical pretreatment, specifically a grit blast, followed by an application of TiBoe, an application of a high temperature sol-gel solution, such as sol-gel solution 334 of FIG. 3, and application of a primer. As depicted, the GIC of reference numeral 6 912 is also significantly higher than reference numeral 1 906. Specifically, the GIC of reference numeral 6 912 is approximately 9 in-lb/in$^2$.

Figure 10:
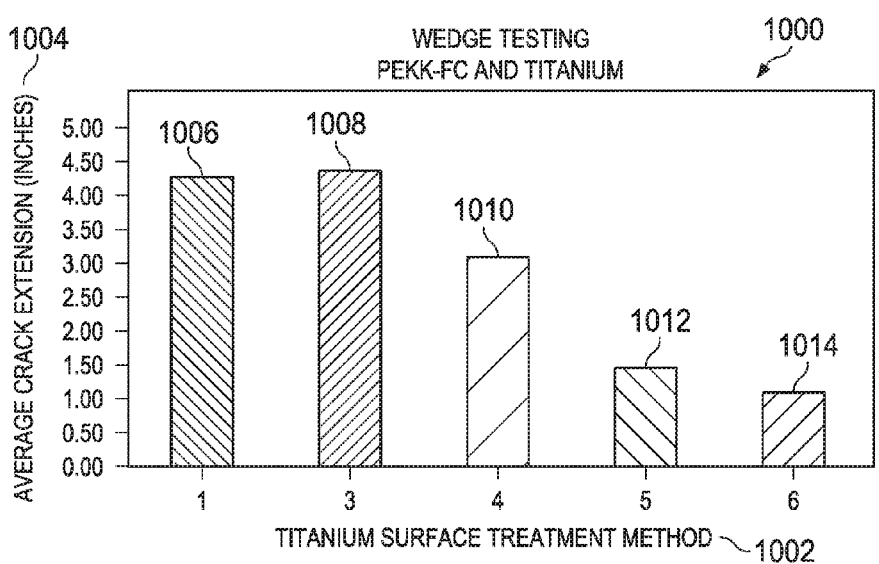
FIG. 10 is an illustration of a bar chart of testing results in accordance with an illustrative configuration.

Turning now to FIG. 10, an illustration of a bar chart of testing results is depicted in accordance with an illustrative configuration. FIG. 10 is an example of wedge crack testing data for a joint, such as joint 314 shown in block form in FIG. 3. Bar chart 1000 has x-axis 1002 and y-axis 1004. As depicted, x-axis 1002 represents the type of surface treatment applied to the metal within the joint. Similarly, y-axis 1004 represents the crack extension of the joint.

Bar chart 1000 contains data from a wedge crack test of joints. In each joint, the thermoplastic material is a PEKK-FC thermoplastic composite. The PEKK-FC thermoplastic composite was applied as a thermoplastic tape. The PEKK-FC thermoplastic composite tape was applied between two pieces of metal. The two pieces of metal are titanium alloys, specifically Ti-6Al-4V.

In this test, a lower value indicates a better hot/wet durability. As depicted, wedge test values improve dramatically by including a high temperature sol-gel solution applied to the metal surface.

Reference numeral 1 1006 represents a joint having a metal receiving a surface treatment identical to of reference numeral 1 808 of FIG. 8. As depicted, the crack extension for the joint is approximately 4.25 inches.

Reference numeral 3 1008 represents a joint having a metal receiving a surface treatment identical to that of reference numeral 3 812 of FIG. 8. As depicted, the change in surface treatment to a chemical pretreatment does not improve the crack extension. The crack extension for reference numeral 3 1008 is approximately 4.35 inches.

Reference numeral 4 1010 represents a joint having a metal receiving a surface treatment identical to that of reference numeral 4, 814 of FIG. 8. As depicted, addition of a conventional sol-gel solution reduces the crack extension to approximately 3.0 inches. However, this value may still be undesirable for a joint.

Reference numeral 5 1012 represents a joint having a metal receiving a surface treatment identical to that of reference numeral 5, 816 of FIG. 8. As can be seen, addition of a high temperature sol-gel solution such as sol-gel solution 334 of FIG. 3 substantially decreased the crack extension in relation to other joints. As depicted, reference numeral 5 1012 has an crack extension slightly below 1.50 inches.

Reference numeral 6 1014 represents a joint in which the metal received a surface treatment identical to that of reference numeral 6 912 of FIG. 9. As can be seen, the addition of a primer following the high temperature sol-gel solution decreased the crack extension. As depicted, reference numeral 6 1014 has a crack extension at approximately 1.08 inches.

The flowcharts and block diagrams in the different depicted configurations illustrate the architecture, functionality, and operation of some possible implementations of apparatus and methods in an illustrative configuration. In this regard, each block in the flowcharts or block diagrams may represent a module, a segment, a function, and/or a portion of an operation or step.

In some alternative implementations of an illustrative configuration, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, in some illustrative examples cleaning the metal in operation 702 of FIG. 7 may occur simultaneously or after aging the zirconium n-propoxide in a solvent to form a first part for a sol-gel solution. In other illustrative examples, operation 702 and operation 704 may be performed after operation 716, aging the solution to form the sol-gel solution. In yet another illustrative example, operation 702 and operation 704 may not be performed.

Illustrative configurations of the disclosure may be described in the context of aircraft manufacturing and service method 1100 as shown in FIG. 11 and aircraft 1200 as shown in FIG. 12. Turning first to FIG. 11, an illustration of an aircraft manufacturing and service method is depicted in accordance with an illustrative configuration. During preproduction, aircraft manufacturing and service method 1100 may include specification and design 1102 of aircraft 1200 in FIG. 12 and material procurement 1104.

During production, component and subassembly manufacturing 1106 and system integration 1108 of aircraft 1200 in FIG. 12 takes place. Thereafter, aircraft 1200 in FIG. 12 may go through certification and delivery 1110 in order to be placed in service 1112. While in service 1112 by a customer, aircraft 1200 in FIG. 12 is scheduled for routine maintenance and service 1114, which may include modification, reconfiguration, refurbishment, and other maintenance or service.

Each of the processes of aircraft manufacturing and service method 1100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of an aircraft is depicted in which an illustrative configuration may be implemented. In this example, aircraft 1200 is produced by aircraft manufacturing and service method 1100 in FIG. 11 and may include airframe 1202 with systems 1204 and interior 1206. Examples of systems 1204 include one or more of propulsion system 1208, electrical system 1210, hydraulic system 1212, and environmental system 1214. Any number of other systems may be included. Although an aerospace example is shown, different illustrative configurations may be applied to other industries, such as the automotive industry.

Apparatuses and methods embodied herein may be employed during at least one of the stages of aircraft manufacturing and service method 1100 in FIG. 11. One or more illustrative configurations may be used during component and subassembly manufacturing 1106. For example, sol-gel solution 334 of FIG. 3 may be used during component and subassembly manufacturing 1106. Further, sol-gel solution 334 of FIG. 3 may also be used to perform replacements during maintenance and service 1114. For example, sol-gel solution 334 may be used in joining a metal a thermoplastic material during an aircraft repair during maintenance and service 1114.

The illustrative configurations may provide a method and apparatus for joining thermoplastic materials and metals. In particular, the illustrative configurations may provide a method and apparatus for creating a joint between thermoplastic materials and metals without fasteners or adhesives. In the illustrative configurations, a joint between a metal and a thermoplastic material is created using adhering. The surface of the metal is chemically treated with a sol-gel solution to create adhesion between the thermoplastic material and the metal.

Further, the illustrative configurations provide for generation of a sol-gel solution to promote adhesion between the thermoplastic material and the metal. This sol-gel solution may be configured to withstand consolidation temperatures of thermoplastic materials. The sol-gel solution may promote adhesion through chemical interactions with the thermoplastic material. Additionally, this sol-gel solution may prevent or discourage material changes to the metal.

One or more illustrative configurations may provide joints between thermoplastic materials and metals with desired material properties. Specifically, one or more illustrative configurations may provide joints with higher shear strength, peel strength, and environmental durability than joints between thermoplastic materials and metals without a sol-gel solution.

The description of the different illustrative configurations has been presented for purposes of illustration and description, and is not intended to be exhaustive or limited to the configurations in the form disclosed. Many modifications and variations will be apparent to those of ordinary skill in the art. Further, different illustrative configurations may provide different features as compared to other illustrative configurations. The configuration or configurations selected are chosen and described in order to best explain the principles of the configurations, the practical application, and to enable others of ordinary skill in the art to understand the disclosure for various configurations with various modifications as are suited to the particular use contemplated.

The invention claimed is:

1. A joint comprising:
   a thermoplastic material; and
   a metal joined to thermoplastic material along a treated surface of the metal; and
   a surface treatment applied to the metal to form the treated surface, wherein the surface treatment further comprises a sol-gel solution comprising:
   zirconium n-propoxide;

aminoaryltrialkoxysilane, the sol-gel solution comprising a mole balance ratio of 1:5 between the zirconium n-propoxide and the aminoaryltrialkoxysilane;
a solvent;
an alcohol; and
deionized water.

2. The joint of claim 1, wherein a minimum mole balance ratio between the alcohol and the aminoaryltrialkoxysilane is 18:1 in the sol-gel solution.

3. The joint of claim 1, wherein a minimum mole balance ratio between the deionized water and the zirconium n-propoxide is 18:1 in the sol-gel solution.

4. The joint of claim 1, wherein the alcohol is selected from the group consisting of isopropyl alcohol, methanol, ethanol, propanol, n-butanol (1-butanol), sec-butanol (2-butanol), isobutanol (2-methyl-1-propanol), tert-butanol (2-methoyl-2-propanol), and 3-methyl-2-butanol.

5. The joint of claim 1, wherein the solvent is selected from the group consisting of glacial acetic acid, glycols, glycol ethers, and butyl ester.

6. The joint of claim 1, wherein the thermoplastic material is a thermoplastic composite comprising reinforcing fibers in a thermoplastic resin matrix.

7. The joint of claim 1, wherein the thermoplastic material is selected from the group consisting of a polyetherimide, a polyphenylene sulfide, a polyimide, a polyetherketoneketone, a polyetheretherketone, an acetal, an acrylic, a vinyl, a cellulosic, a polyamide, a polystyrene, a polysulfone, a polyurethane, a polytetrafluoroethylene, a polyolefin, a polyethylene, a polypropylene, a polyvinylfluoride, a polyetherimide, a polyphenylsulfone, a polycarbonate, and combinations thereof; and
wherein the metal is selected from the group consisting of titanium, titanium alloys, aluminum alloys, nickel alloys, stainless steel alloys, copper alloys, and combinations thereof.

8. The joint of claim 1, wherein the surface treatment further comprises at least one of:
a mechanical treatment applied to the treated surface, wherein the mechanical treatment is selected from the group consisting of grit blasting, sanding, and combinations thereof; and
a chemical treatment applied to the treated surface, wherein the chemical treatment is a chemical etch selected from the group consisting of a phosphoric acid anodize etch, a boric acid anodize etch, a sulfuric acid-sodium dichromate anodize etch, a chromic acid anodize etch, a phosphate-fluoride etch, and combinations thereof.

* * * * *